Patented Mar. 25, 1941

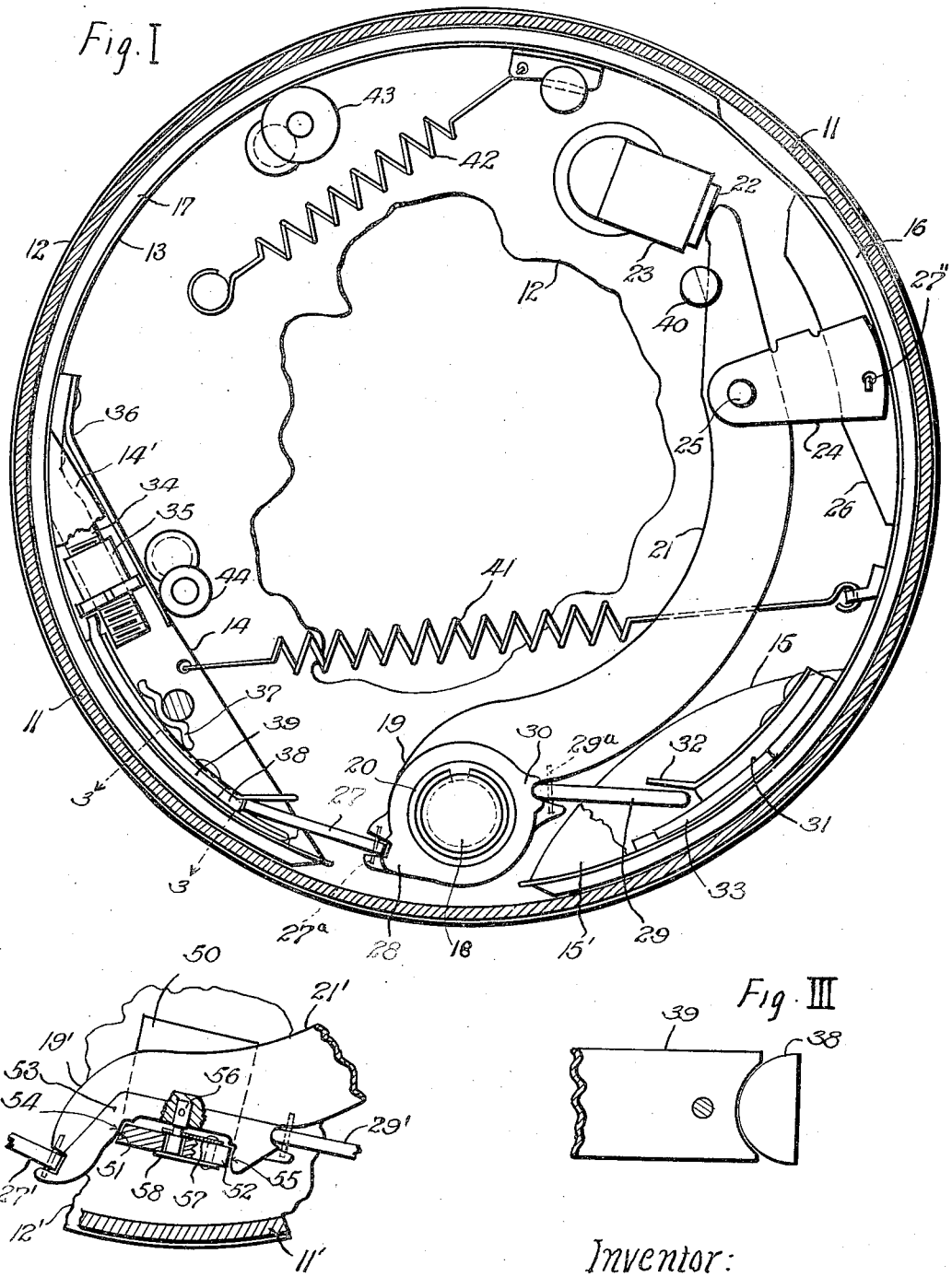

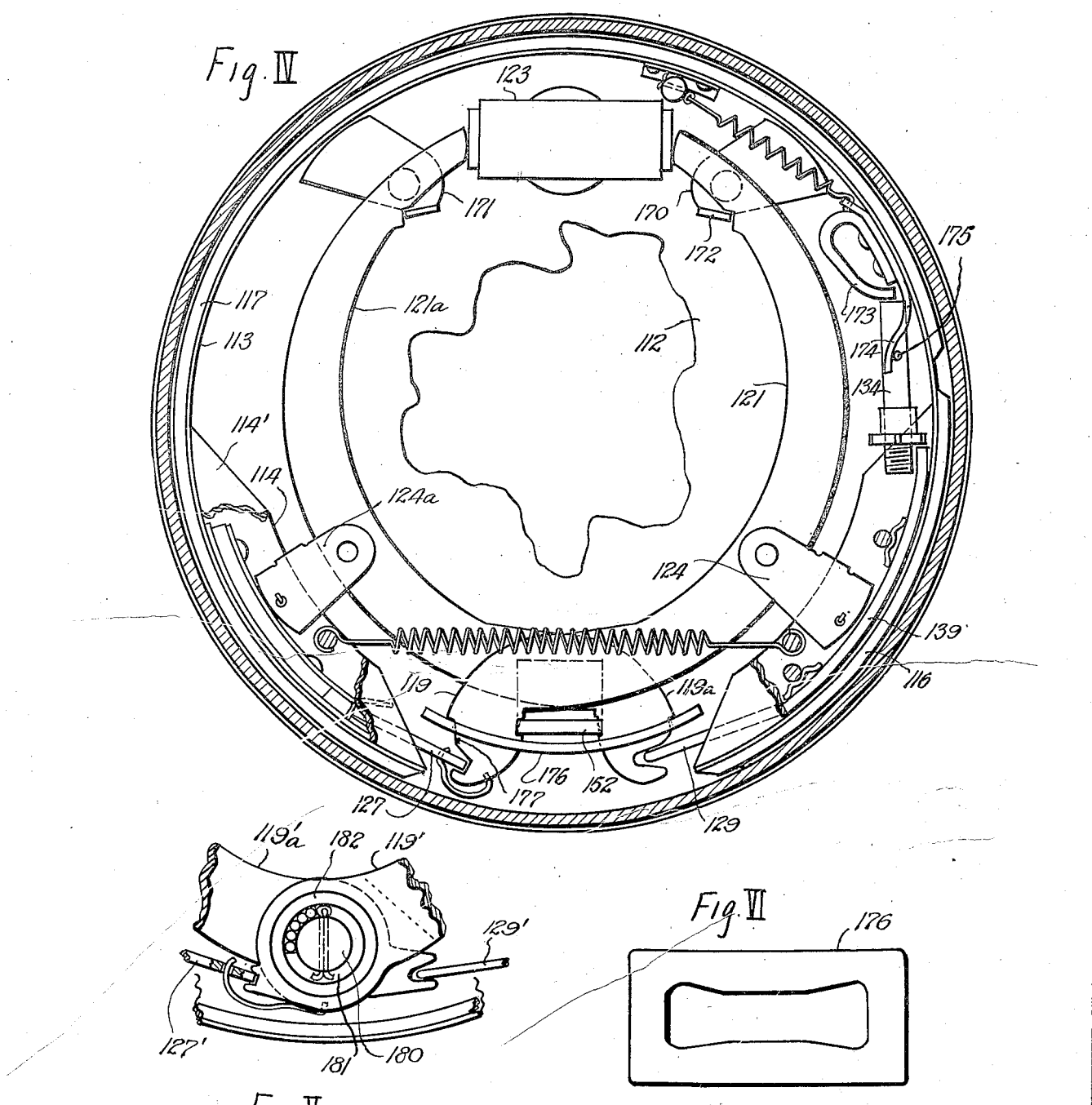

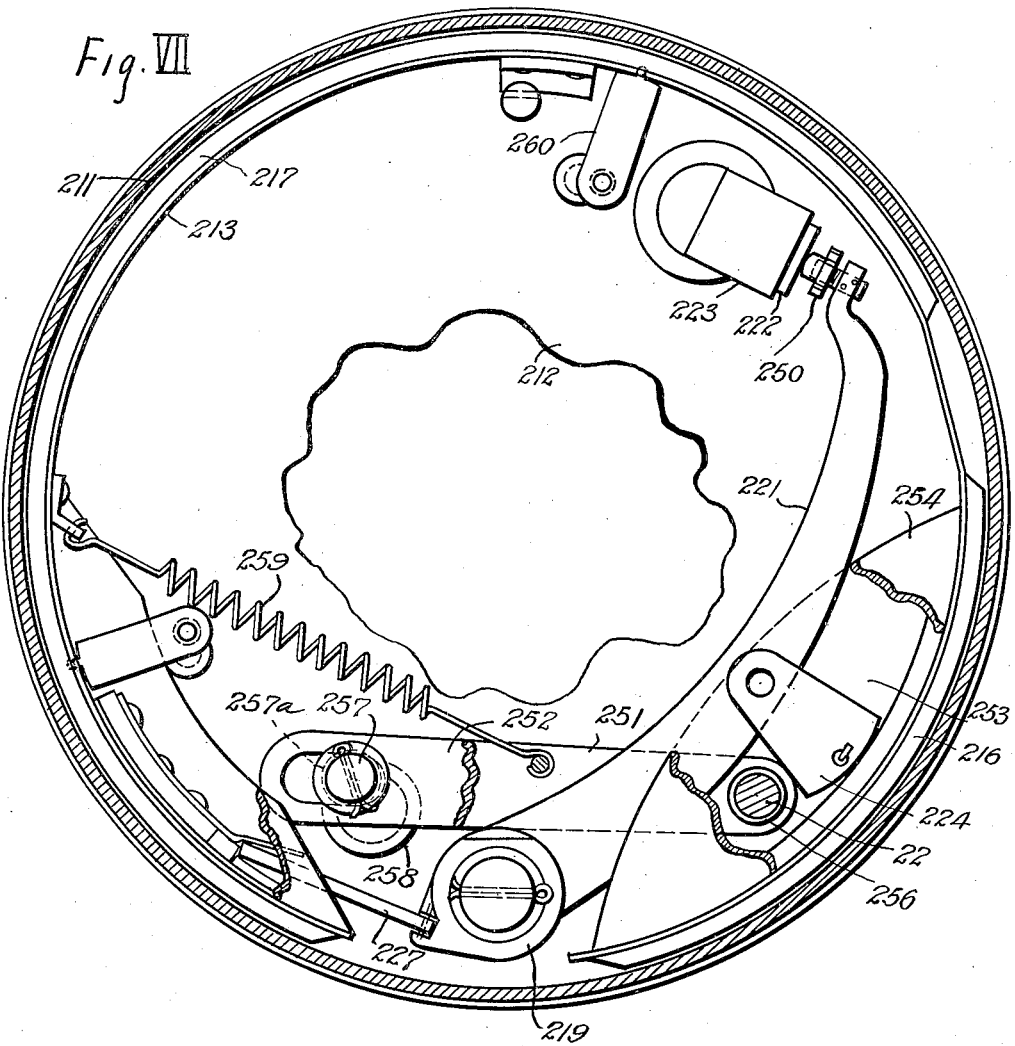

2,236,345

UNITED STATES PATENT OFFICE 2,236,345

BRAKE DEVICE

Bernard H. Mossinghoff, Chicago, Ill.

Application January 25, 1937, Serial No. 122,176

31 Claims. (Cl. 188—78)

This invention relates to brakes for controllably checking or stopping revolving elements as wheels, and refers particularly to vehicle brakes. Reference is made to my co-pending application Serial Number 173,102, filed Nov. 6, 1937, for Brake devices, disclosing and claiming a servo-shoe actuation species of the invention, as also various structures common to the herein disclosed.

One of its chief objects is to reduce the amount of control work required for the brake application, thereby providing a short pedal stroke or pressure or both, if in an automobile, thus serving human convenience and particularly safety in the saving of the application time element through a low positioned pedal. Also, the complication of power braking can be dispensed with in some types of vehicles.

Another important object, having the relation of interchangeable degrees with the previous mentioned, is to provide a greater constancy of braking torque against accidental coefficient changes; and thus affords smoother and more reliably controllable and safer braking as to each brake unit. It also affords better equalization between the several wheels of the vehicle, versus skidding, sway, effectiveness, etc.

Still other objects pertain to the elements embodied for efficiency of operation and production; to the provision of low-friction articulation for the torque-self-compensation fluctuations; to constructions for efficiency and simplicity of radial application of the brakes; etc.

Still further objects will become apparent during the perusal of the specifications and drawings.

To help accomplish a reduced foot-work requirement, in an automobile brake for example, I employ the principle of applying the braking element, band or contrivance to the drum through a substantially radial throw translation; the movement through a single radius being about one-sixth of a full circumference.

Lining clearance closeness to the drum would have importance only at the application point; whereas in conventional brakes of tangential or chordal application, it is not usually practical to maintain or adjust to close clearance for their full periphery. Incidentally the radial application point is virtually that of least wear.

To obtain a substantial tangential initiating torque at the radially applied point, I employ preferably, though not necessarily, a brake lining of higher coefficient at such point. Accordingly, I employ preferably dual linings on the braking contrivance or band; which feature incidentally affects also the distribution of duty.

Furthermore, it is known that in the conventional brake systems in common use today, if too great reliance is placed on the self-energization factor, a too great inconstancy of total braking torque would result under certain conditions, since a comparatively slight accidental change in frictional coefficient of the surfaces, would be multiplied in effect of final torque. Accordingly, the recognized practice is one of compromise. With all other factors remaining the same, the substitution of radial application for the conventional tangential, would increase such inconstancy; though several factors can be modified to offset such disadvantage.

Accordingly I preferably employ also, a torque self-compensation principle. Instead of the conventional method of fixedly anchoring the generated torque, I transmit such torque preferably in a reduced-pressure ratio, so as to inversely and correctively affect the brake applying pressure; namely an increased torque would decrease the brake applying pressure, and vice versa. It would be just as correct to state that the foot-pressure roughly determines the torque, with surplus foot-pressure automatically being shunted towards brake application so as to tend to produce such torque, as to state that the foot-pressure determines the brake application. Self-compensation is a matter of degrees and compromises; not 100% effective. Patent No. 1,975,473, issued to Nieman, on Oct. 2, 1934, gives some elucidation of the self-compensation principle.

Due to the diversity of practice in automotive designing, to the considerations of costs versus quality, etc., I am presenting a number of structural modifications in the drawings, in which, Fig. I is a side view of my brake mechanism, as adapted to an automobile wheel, with the cylindrical part of the conventional brake drum shown in section, and with parts of the brake band's reinforcing webbing broken away. This type discloses a single point of radial application; but with self-compensation for both directions of rotation of the drum.

Fig. II shows a side view of a modified construction of the main fulcrum bearing portion of Fig. I.

Fig. III shows fragmentary view of a detail, taken along line 3—3 of Fig. I.

Fig. IV is a side view, similar to that in Fig. I, of a modified design. It discloses two points of radial brake application; and with self-compensation for both directions of rotation of the drum.

Fig. V shows a side view of a modified construction of the main fulcrum bearing parts of Fig. IV.

Fig. VI shows plan view of tensioning spring of Fig. IV, as blanked out from flat material.

Fig. VII shows side view of another modification in design, in which self-compensation is employed only in one direction of drum rotation.

Design shown in Fig. I 11 is the conventional brake drum attached to and rotating with the wheel of the automobile, and 12 is the conventional fixed backing plate to serve as mounting for the brake mechanism and for closure of drum. Located within drum 11 along its inner periphery and spaced therefrom when the brakes are in released position, as is conventional, is the braking contrivance or band 13, of preferably unitary and flexible construction, and having twin reinforcing webs 14 and 14' affixed along the band's lateral edges, at the forward high-torque end of the band; and has similarly twin webs 15 and 15' similarly affixed at the other or reverse high-torque end of the band. These serve to give some rigidity at such ends to obviate localized high lining pressure points. If it be desired to use thin material for the steel band backing such material may be slightly flared for strengthening at its lateral edges for the full periphery of the band, or by employment of any suitable reinforcing structure known in the art. Along the outer periphery of the band are affixed the friction brake linings 16 of a higher frictional coefficient, and lining 17 of a lower frictional coefficient. Except for the duality of linings mentioned, the constructions indicated so far are similar to those of conventional or known brake designs. Throughout all the drawings forward rotation is in counterclock-wise direction.

Affixed firmly to backing plate 12 is the horizontal round bearing pin 18, upon which lever 19 is mounted for rotation, the needle bearing of conventional construction 20 being press-fitted within the boss of said lever 19, to ride upon said pin 18 to reduce frictional resistance to said lever's rotation. A conventional split ring holds said lever assembly against axial dislocation on said pin 18.

Said lever 19 has an integral long upwardly projecting arm 21, the upper extremity of which abuts against piston 22 of hydraulic brake cylinder 23, both merely indicating some suitable hydraulic brake construction. Hydraulic pressure in said cylinder caused by foot pressure upon the brake pedal as conventionally, forces lever arm 21 to the right, accordingly forces antifrictional roll-sector 24, which is of twin stamped and doubly bent construction and pivoted to said lever 21 by means of pin 25, also to the right. Said doubled roll-sector straddles reinforcing web 26 affixed to the band 13, so that its concentrically curved periphery, presses against the inner periphery of said band. The rightward movement and pressure of lever arm 21 accordingly serves to move and press lining 16 into frictional pressure engagement against drum 11. A small resilient wire 27" passes through said roll-sector and web 26 to prevent tangential dislocation of said roll-sector.

This outward from drum center movement towards the drum, I express as radial application of the brakes, though pin 25 with bearing pin 18 as a pivot, and other control parts, do not move in precisely radial direction. However from the viewpoint of the actuating foot-work required, namely the foot stroke times its maximum pressure, the shown and any equivalent quantitative variations in construction would virtually amount to radial application, namely wherein additional foot-work or stroke does not result from peripheral translation of the brake band. It serves the purposes of simplicity to use the expression radial application in these specifications and claims. Furthermore a slight eccentricity, or irregularity of curved periphery of roll-sector 24, as would not be objectionable for reverse braking, or for slightly returning the pedal after application, or for indicating adjustment need, etc. is included in my concept of radial application.

The self-compensation feature of Fig. I

Instead of fixedly anchoring the ends of the braking contrivance or band 13, as is the practice in conventional brake constructions, I provide that the braking torque generated during the forward or counterclockwise rotation of drum 11 in brake band 13 and accentuated by the commonly known wrapping-action type of self-energization in such flexible band, is communicated through the flat, broad and rectangular thrust bar 27 to the short arm 28 of lever 19, so that said torque opposes the radial application, by tending to force pin 25 leftward, in virtually direct ratio with such torque. Similarly, upon reverse or clockwise rotation of drum 11, the torque generated in band 13 by virtue of frictional contact of lining 16 with said drum, accentuated by wrapping-action and also further by the chord angulation of broad, flat, but round-ended thrust bar 29, is communicated through said thrust bar 29 to the short lever arm designated by 30 of said lever 19, thus similarly opposing the radially applied pressure through roll-sector 24. The effective arm lengths of said two short lever arms 28 and 30 are equal to the perpendicular distances from center of bearing pin 18 to the lines passing through the respective thrust bars 27 and 29. It is not required that equal self-compensation ratios apply to forward and reverse braking, the forward being regarded as the more important as to constancy of torque. The structures serving such communication of torque will be explained further below.

Since, from what has been explained, any accidental increase of torque thrust through bar 27, as might be due to accidental increase in coefficient between lining 17 and drum 11, decreases the brake applying pressure through roll-sector 24, thereby in turn decreasing the torque pressure through bar 27 correctively, I express the function of such interaction, as self-compensation of torque.

It is apparent that the foot becomes burdened with the opposing pressure exerted on lever 19 by thrust bar 27 in addition to that of the brake applying pressure through roll-sector 24, but such excess burden on the foot is favorably out of proportion to the quantitative advantages gained, by permitting safe use of a higher coefficient of lining 17, or of any self-energization factor increases, as the angulation of bar 27, etc. A comparatively small increase in coefficient of lining 17 produces a large increase in total torque, which phenomenon incidentally accounts for the major inconstancies of braking torque in conventional brakes. On the other hand, with other factors remaining the same, the total brake torque seems approximately in direct ratio with the applying pressure. If by way of example, short lever arm 28 is made one-sixth of the distance from bearing pin 18 to pin 25; and if furthermore, 100 lbs. brake applying pressure on pin 25 through roll-sector 24 would, by reason of chosen lining coefficient of lining 17, etc. normally produce 1200 lbs. torque thrust through bar 27, onto lever 19, the rightward pressure duty on lever arm 21, at said pin 25, would be 300 lbs. In this case, disregarding resistant friction, material yields, retract tension, etc., the foot would bear a burden three times that used for the applying pressure. However, on the same bases, if the coefficient between lining 17 and drum, would accidentally change, so as to tend to double the total torque through bar 27, if said bar were fixedly anchored, it will be found that stabilization would actually be attained with an actual 20% total torque increase through bar 27, when affecting lever 19 for self-compensation in the ratio assumed. Because such actual 120% total torque, compared with normal, would effect a 40% decrease from normal of the applying pressure at pin 25 (1/6 of 240 equals 40), the resultant 60% of normal applying pressure being one-half of the 120%, as to normal, total torque, thus satisfying the assumed factor of the accidental doubling of the lining coefficient's effect.

As to the structures disclosed: On the inner periphery of band 13, and between the twin lateral webs 15 and 15', a stamped steel anchoring stop is welded, onto which is riveted arcuated bar 31 and guide plate 32. Beneath said bar 31, and held in place against dislocation by a stud on one end and said anchoring stop at its other end, is a broad flat spring 33, arcuated with a longer radius than the drum radius, so that a space for yield remains between said spring and band 13. When the drum rotates in clockwise or reverse direction, carrying lining 16 and the band portion to which it is affixed, with it, upon pressure application of roll-sector 24, said spring 33 will cushion the shock of contact of thrust bar 29 against end of flat bar 31 and spring 33, thereby reducing the shock on needle bearing 20. However such spring provision is not essential and envisions serious neglect of adjustment, the parts for which will be explained later. When the automobile is stopped up-hill, the consequent backroll of the car might cause such indicated shock if too much lost motion is permitted to develop.
As to the structure for forward or counterclockwise torque transmission: Along the inner periphery of band 13 and between the twin lateral reinforcing webs 14 and 14', I provide an adjustably movable thrust transmitting device, including, a cast adjusting bolt 34 one end of which is firmly riveted to band 13, and the other end of which is threaded to accommodate adjusting nut 35 having hexagonal nibs for convenient tool engagement and for engagement with retaining flat spring 36 against accidental rotation. The face of said nut abuts against and adjustably moves in a peripheral direction a combination of riveted-together broad stampings, heavily pressed against the band periphery by blade spring 37, held in place by a pin mounted transversely through both webs 14 and 14'. Said adjustably movable stamping assembly, is composed of a base strip, with one end turned back upon itself, to retain semi-circular alignment disc (Fig. III) 38, fitting into the circularly punched end of arcuated flat 39. Superimposed thereon is a guiding and retaining blade. Bar 27 abuts against edge of disc 38.

The bearing surface for thrust bar 27, milled in the lever arm 28 is preferably convex cylindrically with a long radius, thus providing rolling action for low frictional resistance. Small resiliently tensioned pins 27a and 29a respectively hold both thrust bars 27 and 29, normally against their bearings on lever 19. The structures of the thrust bars and their bearing means, are interchangeable in the several disclosed types, as desired; and some may even be dispensed with, through direct band to lever contact, if wear due to drum eccentricities is to be tolerated.

In order to adjust the clearance between lining 16 and drum 11 at the radial application portion of the band 13 at web 26, I provide a slotted stud 40, which slot accommodates the end of lever 21 for guiding purposes, and one edge of which slot limits the amount of retract movement of lever 21 by contact therewith. Said stud 40 is adjustably revolvably mounted in backing plate 12, to which it becomes firmly bounded by threaded nut, after adjustment. Any suitable guides, retract system and lining clearance adjustments, may be provided. But I show spring 41, tending to pull both ends of the band together for brake release, which tendency may be in addition to an inherently contractile tension provided in band 13 itself. I provide an additional contractile spring 42, which has the additional function, besides that of retraction, of tending to rotate the band 13 in counterclockwise direction, so as preferably to effect normal contact when the brakes are released, between thrust bar 27 and the respective brake band end, so as to obviate lost-motion for forward braking. For further lining clearance adjustments, I provide rollers 43 and 44, each pivoted on an adjustable eccentric mounting, projecting through backing plate 12, onto which they are firmly held by threaded nuts after adjustment. Roller 44 is shown as riding against the inner edge of reinforcing web 14. If desired, adjustments may be more than conventionally infrequent, or even omitted, though less preferably. The wear of lining at radial application point is small.

*Modification in Fig. II*

To present a less costly and nevertheless strong construction for the main bearing parts, including bearing pin 18 and needle bearing 20, of the structure of Fig. I, I provide an originally flat and rectangular steel stock 50, at one partial longitudinal edge of which, slanted flat-milled groove 51 is milled preferably through gang milling operation. Whereupon said stock 50 is bent 90 degrees and welded on backing plate 12', so as to provide the horizontally extending fulcrum bracket 52, to serve as pivot fulcrum for lever 19', to replace lever 19 in its functions of Fig. I. Said lever 19' has an integral broad section 53, for purposes of strength, but primarily to afford a broad bearing surface contact, into which broad section are milled the cylindrically convex bearing surfaces 54 and 55, the angulation of milled bearing 51 permitting use of multiple side mills for this operation simultaneously. Said milled surfaces 54 and 55 have each a long radius to provide quantitative roller strength for their heavy rolling bearing contact against edges of fulcrum 52. In said lever 19' are also milled bearings similar to corresponding bearings in lever 19 of Fig. I, to accommodate thrust bars 27' and 29', which function similarly as the respective parts 27 and 29 of Fig. I. In order to retain lever 19' in place and in normal suspension over fulcrum 52, so as to permit lee-way for functional rockability, I provide a tensioned centering spring arrangement, consisting of automatic screw machined stud 56, pinned firmly in a drilling in lever 19', and having a narrowed annular neck, into which slotted flat spring 57 fits, for edge contact against the full diametered portion of said stud projecting into a round hole punched in fulcrum bracket 52, so that flat spring 58 may abut and press against the lower end of said stud. Both flat springs 57 and 58 press with initial tensioning against the flat surfaces of fulcrum 52, to which they are firmly riveted, and hence hold lever 19' in suspension with a firm centering tension.

Fulcrum bracket 52 may be slanted in respect to the radial line of the drum, in any angle desired to determine the chord angulation of thrust bar 29', which affects the self-energization factor, in relation to the coefficient chosen for lining 16 (Fig. I); and the fulcrum bracket 52 may be slantingly milled also at its right edge serving as bearing for surface 55. The bearing surfaces on said fulcrum are preferably perpendicular to the direction of the resultant of the respective forces affecting it. To minimize the strain on flat spring 58 and a sliding tendency on bearing surface 55, it is preferable to angle the hydraulic cylinder actuation, so that its direction of force affecting lever 21' is more closely parallel to the drum's radial line passing through pin 25 (Fig. I), considering that the whole brake mechanism may be relocated in respect to the vertical gravity line, so that any trapped air in the hydraulic brake cylinder may be made to readily escape. With an outer non-milled edge remaining after milling of groove 51 in fulcrum bracket 52, lever 19' may be held against axial displacement on said fulcrum, if the slot in flat spring 57 is not desired to serve such purpose. Considering the small amount of wear of lining 16 at the radial application point and its closeness of clearance adjustment, the amount of functional rocking of lever 19' on its fulcrum bearings, and accordingly the variation of effective lever lengths, will be comparatively small.

The direction of rock or rotation and the functioning of lever 19' with its arm 21', as also the torque thrust and transmission through flat bars 27' and 29', are identical to those of the counterparts identifiable by similarity in characters in Fig. I; the modification residing wholly in substitution of structure for bearing pin 18 with its immediately adjacent cofunctioning parts. Fig. II presents an anti-frictional rocking action type of bearing in place of the more conventional needle bearing type, constituted of small diametered rollers annularly surrounding pin 18 within racer 20 of Fig. I. Questions of relative costs, durability and simplicity, apply primarily in choosing between these two types.

Assuming the drum 11' to be rotating in forward or counter-clockwise direction, hydraulically applying the brakes by forcing lever arm 21' rightward, and through roll-sector 24 (mounted on 21' just as on 21 of Fig. I) pressing lining 16 against drum 11' for torque initiation, the bearing surface 55 of lever 19' will momentarily press leftward against fulcrum bracket 52, due to the intermediateness of pivot pin 25. Such fulcruming contact gives effectiveness of initial pressure between lining 16 and drum 11', and creates almost instantly (and normally while the applying pressure through 24 is still comparatively small), a rightwardly directed torque thrust, through bar 27', onto lever 19', thereby forcing its bearing surface 54 against surface 51 of fulcrum bracket 52.

Thereafter, for such forward rotation, these mutual bearing surfaces 54 and 51 assume the effective functioning as anti-frictional rock pivoting for lever 19', for transmitting the torque to the brake application means. However, if the drum rotation were in the reverse or clockwise direction, the bearing at 55 would not only initiate but continue to serve for the torque transmission through thrust bar 29', in which case, bearing surface 54 would remain inoperatively out of contact with the bracket 52. The lost-motion, due to machining tolerance, or subsequent wear, which accompanies the switching from bearings 55 to 54, is small.

During the very initial light-pressured stage of said application of lining 16 to drum 11', and due to the amount of stored tension in blade spring 57 of the centering mechanism, there will be a very slight downward sliding of bearing surface 55 on bracket 52, due to the spring 57 predominating, though only momentarily, over the resistant friction between said surfaces. However, as soon as substantial torque becomes effective the quantitative predominance of friction between surfaces 54 and 51 against mutual sliding, prevents dislocation therebetween. Instead, spring 57 will yield upwardly or spring 58 downwardly, as the case may be and as urged by the respective contacting shoulders of stud 56, thus permitting bearing surface 54 to roll or rock upon surface 51 without large friction or wear, for the virtually imperceptible normal rocking movement of lever 21' (drum eccentricities tend to increase such movement, however), during the torque self-compensation functioning. In view of the explanations given with Fig. I, the further functioning of the type of Fig. II, is presumably evident.

*The double-action types of Figs. IV and V*

The type shown in Fig. IV differs from that of Fig. I already explained chiefly in that it provides dual brake radial application points, both operating at each brake operation, but one initiating self-multiplication or self-energization of torque for the forward rotation of the drum, and the other for the reverse rotation. Fulcrum bracket 152, is of somewhat similar construction, mounting and purpose as the fulcrum bracket 52 (Fig. II). It serves as bearing, however, for two distinct levers 119 and 119a, having broad convexedly milled bearing surfaces for rolling action on the fulcrum bracket, which two levers laterally cross each other, so as to extend towards the opposite sides of drum center, providing the long arms 121 and 121a, the upper ends of which abut against the pistons of any suitable or conventional type of double-acting hydraulic brake cylinder 123. The two roll sectors, 124 and 124a, serve the purpose of radially applying the brake band 113, as explained for roll sector 24 of Fig. I, except that it applies both ends of the band simultaneously, which band has dual coefficiented brake linings, 116 of the higher coefficient and 117 for the lower. Counterclockwise rotation of the drum 111 is assumed for forward.

I provide a peripherally extensible adjusting mechanism, at the right end of band 113, similar in function as the adjusting device, shown for the left band end of Fig. I. However the arcuated part 139 of originally flat stock, is disclosed as one integral member with thrust bar portion 129, which portion is sufficiently flexible to accommodate itself to the comparatively slight wear of lining 116, as also to any drum eccentricities.

The anchoring abutment for the other thrust bar 127, composed of an assembly of stamped flats arcuated are firmly affixed to inner periphery of brake band 113, between the twin reinforcing webs 114 and 114'. The opposite end of band also has twin reinforcing webs, all shown as affixed to band 113 along its lateral edges, though if made radially shallow, they might feasibly be formed integral with the band, without much wastage of material.

For adjusting the lining clearances at the radial application points, namely at the end portions of band 113, I provide the originally flat stamped members 170 and 171 with upbent lip as 172 for checking contact with lever 121 and similarly for the other lever arm, which adjusting members are affixed to a stud, which rotatably project through the backing plate 112 onto which they are firmly held after adjustment by means of threaded nut. Such adjusting members have in addition outer eccentric peripheries of suitable arcuation to simultaneously adjust the lining clearances at the respectively contiguous portions of the band, which latter mentioned lining clearances however are not important as to brake pedal travel; accordingly they are to be of safely sufficient distances, so that accuracy of adjustment at the radial application points can always dominate.

Instead of providing that adjusting bolt 134 be fixed relative to band 113, as is its counterpart in Fig. I, I arrange that its upper end axially abuts against the originally flat and wide, and thereafter looped cushioning spring 173, firmly riveted on band 113 together with the forked blade spring 174, the both prongs of which extend to both sides of adjustment bolt 134 engaging a pin 175 therethrough for purposes of retaining bolt 134 in place and prevent its rotation. The loop of said cushioning spring 173 is openended, so as to allow for a yieldable cushioning movement, resulting in the closure of said loop upon heavy thrust tension through thrust bar 129, thus cushioning the bar's contact with lever 119a, for the same purpose as explained for spring 33 of Fig. I. Such cushioning spring however might be dispensed with or replaced by any other suitable construction.

In order to retain levers 119 and 119a in firm contact with their bearings on fulcrum bracket 152, especially in view of the condition that only one of the thrust bars 127 or 129 acts to maintain such contact at any one time, I provide the originally flat centrally punched out to form a closed elongated loop, and thereupon arcuated tensioned blade spring member 176 (Fig. VI) which is sprung in place around both levers 119 and 119a, so as to press said levers inwardly; the elongated loop inner ends of said spring member 175 pressing against flat surfaces milled in said lever simultaneously whilst milling the thrust bar bearings of said levers. Said flat contacting surfaces, as 177 become out of parallel converging towards the center of the drum, when in normal position to prevent dislodgment of said spring member 176. The tension of said spring member 176 is of sufficiently large quantity to overcome the pressure exerted on the respective levers by the actuating hydraulic pistons; and the lower edges after milling the main fulcrum bearings in said levers 119 and 119a, contact the lower edge of the fulcrum millings or the lower fulcrum (152) face, to retain said levers from upward dislodgement, which might otherwise result from the direction of the resultant of forces caused by such hydraulic actuation. Incidentally said blade spring 176 holds the levers in assembly.

The modification disclosed in Fig. V shows a substitute construction of the main pivot or fulcrum bearing of Fig. IV, and dispenses with blade spring 176 of said Fig. IV. Design 180 is the round bearing pin firmly affixed to the backing plate, just as in Fig. I design 181 is a broad needle bearing of conventional design, press-fitted firmly in broad sleeve 182, encompassing which sleeve is fork ended lever 119', the prongs of which straddle an accordingly centrally mounted lever 119a'. Both of these levers have a freely rotatable fit over sleeve 182, so that the needle bearing will preferably revolve with the respective lever, which at any particular moment is subject to the greater bearing pressure, namely the one transmitting torque.

Thrust bar 127' rides on convexedly milled bearing of both forks of lever 119'; and thrust bar 129' rides in bearing milled in lever 119a' and have the similar functions as their counterparts in Fig. IV.

The operation of the double-acting designs of Fig. IV and Fig. V are presumably readily understood from the understanding of the previously explained designs. The foot actuation accomplishes radial application of the band 113 to drum 111 at two points, entailing a foot travel twice as much as for one point. However, the whole band is functioning for each direction of the drum. Though a single lining may be used, the differences in effect of dual coefficiented linings, may be compensated for by differences in lever arm lengths for thrust bar contact, thus affecting different self-compensation ratio factors for forward and reverse rotations, which has the further effect of differences in radial application pressures with the same hydraulic actuation pressures.

*The modification of Fig. VII*

This design discloses a single point of radial application; and also self-compensation for a single direction, namely for forward, but not for reverse. Lever 219 is of somewhat similar construction, mounting and functioning as lever 19 of Fig. I, though I disclose a radial application clearance adjusting screw 250, abutting against hydraulic piston 222, which is assumed to be definitely limited in its inward travel in cylinder 223. The radial application is shown, as moving and pressing the end of band 213, which has the higher coefficiented lining 216 to the drum 211, which band end is reinforced by twin webs, as explained for the other types. However, when the drum rotates in the reverse or clock-wise direction, the torque of band 213 is not communicated or transmitted, for self-compensation purposes, to affect the radial application, as in the other types already explained.

Instead, I provide twin parallel, spaced-apart, and identically constructed chord links 251 and 252, each contiguous to the inner face of the respective reinforcing webs 253 and 254, onto which they are rotatably mounted by pin 255, with a sleeve 256 encompassing said mounting pin and between said chord links to keep them spaced apart. Said chord links extend to both sides of lever arm 221, to an adjustable bearing stud 257, passing through elongated slots in the ends of said chord links, over which stud a separating sleeve 257a is held between the chord links to keep them spaced apart; and a washer and cotter pin at the outer end of said stud hold said chord links in assembly. Said stud 257 is an integral part of its adjusting eccentric base, having an integral collar of enlarged diameter 258, and a threaded shank passing through backing plate 212, to which it is firmly held by means of nut, after adjustably setting through rotation of said shank, the horizontal position of said stud 257, to take up lining wear. Chord links for brake bands or shoes, as well as their purposes, angulations, etc., as well as the eccentric adjustment principle indicated, are well known. In disclosed construction, it serves as the self-energization device for the reverse or clock-wise direction of drum rotation, namely by its reaction pressure on the shoe-equivalent end of band 213, which end portion alone is in functional operation, when braking for reverse, upon radial application of roll-sector 224 pressing lining 216 onto the drum. With the same hydraulic actuation pressure, such radial application pressure on the drum, for reverse, is naturally larger than for forward, since the brake torque does not resist such application.

Spring 259 is mounted centrally from a pin or wire loosely spanning both chord links, and extends to a clip fixed to brake band 213, and as shown it has the tendency normally to hold thrust bar 227 in preferred contact, when the brakes are in release; though any suitable retraction system may be employed. The indicated lost-motion at right end of chord link slots, results from such preferred forward contact.

The eccentrically adjustable lining clearance adjustment roll-sectors, as 260 are provided with a small tooth on their peripheries to engage in corresponding small holes punched in band 213, and allow facile rotation of the band; though any other known substitutes of lining clearance adjustment, retraction or guiding may be employed, in any of the disclosed types.

It is obvious that the explained chord-link self-energization principle may be used with the band construction and radial application roll-sector location shown in the type of Fig. I; and vice versa; namely the chord links would be attached to webs 15 and 15' of Fig. I. Such construction has certain preferences over that shown in Fig. VII. If any additional reinforcement for semi-rigidity of band end, as the extension of web 26 (Fig. I) further downward, is desired, a slight inherent inward bend of said band, would prevent drum contact of such end portion of the band for forward braking.

*Supplemental remarks*

The chief purpose in providing low frictional articulation for the heavy brake torque transmission, as the provision of needle bearings (which are small diametered roller bearings) and rocking bearings as disclosed, is to accomplish better responsiveness for the self-compensation function, in view of the fact that virtually double the amount of friction percentage (action and reverse action) would determine the range of ineffectiveness of response. On the other hand, frictional resistance, some of which is always present, at such points, would tend to dampen over-sensitiveness.

It is obvious that I disclose two well-known species of "self-energization," or self-amplification of braking torque, namely: the self-wrapping type of a flexible brake band, and the chordal link reaction type. Both have the effect of a brake band or shoe, to partially tighten itself against the rotating drum, resulting in a larger total braking torque, than the original application force alone can account for. Though the self-wrapping species provides the greater braking torque constancy, nevertheless, interchanging or quantitative proportioning of the duty of self-energization is optional with the particular designer. Due to accidental variations in the frictional coefficients between the linings and the drums, the larger the self-energization factor employed, the more the braking inconstancy is progressively exaggerated. Calculations would disclose that it is far from incongruous to permit the torque considerably to multiply itself through self-energization, and thereupon to employ the thus generated torque to reduce the original application pressure, and consequently to reduce the total brake torque, for self-correction purposes. Only a small percentage of the total generated torque, suffices to affect the original application pressure to a very profound degree.

It is evident that any system of suitable brake shoes could be employed in place of the unitary band disclosed; furthermore, that the band may be made in distinct sections; or that the combination of shoe and flexible band may be employed. Portions of the disclosed band are virtually as shoes in a sense. In the claims, I employ the term "contrivance," or equivalent expression, to denote any such suitable types. Furthermore, whether hydraulic or mechanical actuations are employed, does not affect the substance of my invention.

I claim:

1. A braking system, including a revolvable element to be braked, a relatively fixed contrivance for frictional braking engagement with said element, applying means with connection arranged to press part of said contrivance against said element through a substantially radially directioned line of force or torque initiation, and operatively yieldable torque-anchoring means associating said contrivance with said applying means so that increasing braking torque of said contrivance increasingly opposes the application pressure, the torque from said initiating application moving a further part of said contrivance against said element to produce torque against said anchoring means.

2. A vehicle braking device, having an outer revolving drum to be braked in a certain direction of rotation, an inner relatively fixed frictional braking contrivance adapted for substantially unitary rotation for said direction and having a torque-initiating portion and a peripherally distanced apart self-multiplied torque portion, an operator controlled brake applying device mounted and thrustingly connected to apply said initiating portion to said drum through substantially drum-radially directioned line of force thereby initiating torque engaging said multiplied torque portion with said drum, and yieldable anchoring means for said contrivance mechanically associating said multiplied-torque portion with said applying device so as to increasingly oppose the initiating pressure application correctively with increased torque of said high torque portion.

3. A brake system, including a revolvable element to be braked, a relatively fixed frictional braking contrivance for braking engagement therewith, applying means constructed and mounted and with connection to apply at least part of said contrivance to said element through substantially radial translation, and a fixedly pivoting torque receptive and transmission mechanism, checking rotation of said contrivance in a respective direction and associating said contrivance with said applying means so as to transmit torque force thereto with a leverage ratio substantially smaller than that of the said contrivance part to its said applying means and to decrease the application pressure with increase of said torque.

4. A brake system, including an outer revolvable cylindrically surfaced member to be braked, an inner relatively fixed flexible friction-surfaced brake band, control means connected to apply a torque initiating portion of said band outward against said member through substantially radial translation thereby causing torque to apply a further portion of said band and initiating torque-multiplying wrapping action in said band, and a combined anchoring and torque-transmitting means connecting a multiplied-torque portion of said band with said applying means, directionally so that increased torque of the band will decrease the initiating pressure application.

5. In a brake, an outer rotating drum to be braked, an inner frictional braking device engageable therewith, and having self-energization characteristics, control means applying said device to said drum, and mechanism yieldably anchoring and receiving torque from said device during its rotation in either direction and associated with said control means so as to transmit torque fluctuations to affect correctively the applying pressure, which mechanism includes a common main anchor bearing pivotal for torque transmission for either direction and of the rolling antifriction type.

6. In a braking system, a rotatable element to be braked in a certain direction, a frictionally therewith engageable braking means unitarily rotative for said direction, means applying said braking means to said element, yieldable anchoring means mounted and connected to check rotation of said braking means and to transmit torque therefrom to said applying means for at least one direction, and resilient cushioning means functionally between said anchoring means and said braking means.

7. In a brake, a rotatable element to be braked against rotation in either direction, a braking contrivance for frictional braking engagement therewith, and a common control lever connected to apply said contrivance to said element for both of said directions, said lever having further connections with said contrivance so as to transmit braking torque energy from either direction of rotation to vary the applying pressure for torque correction.

8. In a brake, an element to be braked against rotation in either forward or reverse directions, a unitary flexible self-wrapping brake band for frictional braking engagement therewith, anchoring means to check rotation of said band and control means applying said band to said element at a common point for both of said directions through substantially radial actuation, said applying point being peripherally distanced from the respective end of the band so as to provide substantial band-flexibility self-wrapping torque multiplication for one direction, said band and anchoring means combination comprising further functionally distinct torque-multiplying self-energization construction effective for the other direction.

9. In a brake, an element to be braked against revolution in either direction, a relatively anchored braking contrivance for frictional braking engagement therewith, and control means to apply said contrivance to said element by substantially radial actuation at one common point for both directions, said contrivance comprising self-energization constructions functionally between said application point, to both sides thereof and the respective anchoring means for either direction of rotation of said element, and further comprising multiple coefficiented friction lining with the higher coefficient at said radial application point, and yieldable anchoring means checking rotation of and connected to transmit torque from said contrivance during at least one direction of rotation directly to said control means to modify the application pressure.

10. In a brake, a revolvable element to be braked, a relatively anchored braking contrivance arranged for substantially unitary rotation for said direction for frictional braking engagement with said element and having two end portions, and control means having substantially radially functioning connection to substantially radially apply one of said end portions to said element and having other substantially more tangential connection with the other end portion so as to transmit the generated torque of said last portion to oppose said radial application.

11. In a brake, an outer cylindrical member to be braked against forward or reverse rotation, an inner therewith frictionally engageable braking contrivance adjacent the inner periphery of said member and having two functional ends, dual control means adapted to apply each of said ends respectively to said member by substantially radial application, and dual torque transmitting mechanism arranged to transmit respectively the peripheral torque of each of said ends to oppose the radial application at the opposite end interchangeably according to the direction of rotation of said member.

12. In a brake, an outer cylindrical member to be braked against forward and reverse direction of rotation, an inner therewith frictionally engageable braking contrivance adjacent the inner periphery of said member and having two functional ends, dual control means applying each of said ends respectively to said member by substantially radial application, and dual torque transmitting mechanism having a common bearing and anchoring member and arranged to transmit respectively the peripheral torque of each of said ends in reduced ratio to oppose the radial application at the opposite end interchangeably according to the direction of rotation of said member.

13. In a brake, an element to be braked against rotation in either forward or reverse direction, a braking contrivance adapted for frictional braking engagement therewith, control means adapted to apply said contrivance to said element through substantially radial application, a yieldable torque anchoring device arranged to transmit forward directional braking torque energy to affect said application for torque correction, and anchor means functionally rigid in respect to corrective torque transmission for the reverse braking torque and self-energization means between said contrivance and anchor means to magnify said reverse torque, in substantial measure.

14. In a brake, an element to be braked against rotation in either forward or reverse directions, a braking contrivance for frictional braking engagement therewith, control means adapted to apply said contrivance to said element at a single point through substantially radial application, yieldable torque anchoring and transmitting means communicating the torque generated through forward rotation at one end of said contrivance to said applying means for torque correction, and a functionally rigid anchor connecting through chord link means with the other end of said contrivance.

15. In a brake, an element to be braked against rotation in either forward or reverse directions, a braking contrivance for frictional braking engagement therewith and with dual coefficiented linings, control means applying said contrivance to said element at a single point coinciding with said higher coefficiented lining through substantially radial application thereby initiating self-wrapping action through the lower coefficiented lining for the forward rotation, a single lever rockably mounted on a fixed bearing and having a short arm connecting with said contrivance so as to receive the torque from the respective end of said contrivance for forward direction and having another arm associated with said application means for torque correction, and a functionally rigid anchor connecting through chord link means to anchor the other end of said contrivance for reverse rotation.

16. In a vehicle brake system, a rotatable element to be braked, a therewith frictionally engageable braking contrivance, anchoring means having connection with said contrivance to check its rotation in one direction, operatively yieldable torque transmission means mounted and having further connection with said contrivance to check and receive torque from its rotation in the other direction, and driver operated applying means having still further connection with said contrivance to press it to said element to initiate said torque and having operative association with said yieldable means whereby the torque correctively opposes the application pressure.

17. In a brake system, a member to be braked against rotation in either direction, a relatively anchored therewith frictionally engageable braking contrivance having two end portions, operator controlled effective brake applying means having connection to press said contrivance to said member, a functionally distinct combined anchoring and torque reception mechanism yieldably mounted and having additional connections with each of said two end portions so as to be operable by the torque therefrom in either direction of rotation, and further having association operatively with said applying means directionally so that said torque opposes the application, for torque correction, said applying means through its said connection effectually initiating the braking torque operating said mechanism.

18. In a vehicle braking system having an outer revolvable element to be braked, and an inner relatively anchored therewith frictionally engageable braking contrivance, which contrivance has a substantially radially outward movement and pressure towards said element for brake application, and has limited torque registering rotative movement with said element, operator controlled means with connection substantially radially disposed to effect said radial movement and pressure for effectually initiating torque generation, and means substantially differently connected with said contrivance so as to be operable by the consequent torque-registering rotative movement and associated with said control means to quantitatively control said radial pressure upon either direction of rotation.

19. In a braking system having a revolvable member to be braked in a respective direction and a relatively anchored therewith frictionally engageable substantially unitarily rotative braking contrivance adapted to accumulate high braking torque at one portion upon initial pressure application at another portion peripherally distanced therefrom, a single relatively fulcrumed oscillatable lever, having one arm co-movable substantially directionally with and connected with said application portion, and having another arm disposed substantially directionally opposed to and connected with said high torque portion so as to receive torque force therefrom in a virtually direct line of force transmission and transmit such torque through said lever's oscillation directionally to reduce said application pressure, and operator controlled means connected to move said lever causing said initial pressure application and opposing said torque.

20. In a brake system a rotatable element to be braked, a therewith frictionally engageable braking contrivance arranged to limitedly rotate with the element and having functionally two ends, a lever fulcrumed functionally substantially between said ends and having substantially oppositely disposed arms respectively having connections with said two ends, a floating force transmission element for at least one of said connections, an effectually additional arm on said lever for brake application and having connection with said contrivance intermediate said ends, and external operating force means arranged to apply said lever, the relative disposition of the mentioned parts being such that revolution of said lever in one direction applies said contrivance to said rotatable element and spreads said ends.

21. In a vehicle brake system, an outer revolving member to be braked, an inner therewith engageable braking contrivance having friction facing and two end portions, operator controlled brake control means, anchoring means connecting with said end portions to check rotation, including a fixedly pivoted device associated with said control means and thrustingly with at least one of said end portions and thereby yieldable so as to transmit torque therefrom to said control means, and variable adjusting means comprising a variably extensible threaded adjusting screw assembly on said contrivance and connected anchoring means combination, directionally mounted and constructed to elongate the circumferential length of said combination for facing wear compensation.

22. In a brake, a rotatable element to be braked, a normally spaced therefrom and therewith frictionally engageable braking contrivance having two end portions, operator controlled means applying through substantially radial application said contrivance to said element to brake in a respective direction, anchoring means connecting with a respective end portion to check its rotation in said direction, and a common variable adjusting means having dual simultaneous connections respectively with both said contrivance and said applying means.

23. In a vehicle wheel brake, a rotatable member to be braked in either direction of rotation, a flexible unitary self-wrapping frictional brake band for braking engagement with said member for both directions, and having two functional ends, operator controlled means mounted and functionally connecting with an intermediate part of said band to apply said band to said member for either direction of rotation through a substantially radially directioned line of force, and a brake torque anchoring and transmission mechanism connecting to said ends and associated with said means so that the torque opposes the brake application for at least one direction of rotation, said unitary band having differently coefficiented friction lining at its functionally opposite peripheral portions.

24. In a brake system, a rotatable drum member to be braked, a braking contrivance therein, normally spaced therefrom and frictionally engageable therewith, brake application means comprising a duality of elements connecting with said contrivance at a duality of peripherally spaced apart points and directionally disposed so as to exert a duality of substantially drum-radially directioned lines of application force against said contrivance, a relatively fixed support, and a combined torque anchoring and transmission means anchoring on said support, torque-receptively connecting with said contrivance and torque-dispensively associated with said application means, so that brake torque opposes said application force for torque correction.

25. In a brake system, a rotatable drum member to be braked in a respective rotational direction, a therewith frictionally engageable braking contrivance normally clearance spaced therefrom adapted for substantially unitary rotation for said direction, a relatively fixed support, a combined operation and control mechanism mounted on said support, arranged and having connections to direct torque-initiating force substantially drum-radially against said contrivance with consequently substantially radial clearance movement applying it against said rotatable member, and having further torque-receptive connection with a generated high torque portion of said contrivance and constructed to transmit such torque partly against said fixed support for anchoring and partly against said initiating force for torque correction.

26. In a brake system, a rotatable member to be braked in at least one rotational direction, a therewith frictionally engageable retarding contrivance, brake applying means pressing said contrivance against said member thereby initiating brake torque, a fixed support, a combined torque anchoring and transmission means associated with said applying means and movable on said support to transmit brake torque to oppose said applying pressure, and a floating torque transmitting link connecting said contrivance with said last means and angularly disposed to substantially magnify the transmitted torque.

27. In a brake system, a revolvable cylindrically surfaced member to be braked, a retarding contrivance mounted adjacently therewithin, arranged to be engageable therewith and to be limitedly rotated thereby, and having two end portions, a fixed support, anchor means on said support and having connection with each of said end portions to check rotation in either direction, driver-operated applying means having further connection with said contrivance to press it against said member thereby causing torque to rotate said contrivance to press against said anchor means, said anchor means including an element movable by said certain directional rotation of said contrivance and associated with said applying means directionally so that the force of said movement reduces the application pressure.

28. In a brake, a rotatable drum to be braked, a retarding device frictionally engageable therewith and comprising an actuator part and an actuated part, said actuator part being adapted to be circumferentially shifted by said drum upon its rotation to apply the actuated part against the drum, external force operated means arranged to apply the actuator part against the drum through substantially drum-radially directed applying force, and means whereby torque reaction from either direction of rotation of drum rotation opposes the said applying means.

29. In a brake, a rotatable member to be braked, a retarding device arranged to be frictionally engageable therewith and comprising an actuator element and actuated elements disposed in the rotative path to both sides thereof, said actuator element being adapted to be shifted by said member upon its rotation and to apply the actuated elements thereto interchangeably according to the respective rotational direction, external force operated means adapted to apply said actuator element to the member, and means whereby torque reaction from the member's rotation in either direction of rotation opposes the said applying means.

30. In a brake device, the combination of a rotatable element, a friction contrivance for cooperation with a surface thereof substantially unitarily rotative in a certain direction, external force means arranged to apply the contrivance by force directioned substantially perpendicularly to said surface, and means whereby torque from the braking operation upon rotation in said direction opposes the external force means.

31. In a brake, a rotatable member to be braked, a frictional braking device for cooperation with a surface thereof, driver-operated means adapted to apply the device to the member by substantially radially directioned force application, and means arranged to communicate braking torque from the device to oppose the application, comprising structure whereby the ratio of such torque force against the said applying force is substantially smaller than the ratio of the resistant force of the device against said applying force, thus substantially reducing the work required for braking.

BERNARD HY. MOSSINGHOFF.